United States Patent [19]

Mustard

[11] Patent Number: 4,846,055
[45] Date of Patent: Jul. 11, 1989

[54] BALING MACHINE AND METHOD OF FORMING A BALE

[76] Inventor: Larry D. Mustard, Star Route Box 70, Lexington, Nebr. 68850

[21] Appl. No.: 163,324

[22] Filed: Mar. 2, 1988

[51] Int. Cl.$^4$ .......................... B30B 1/26; B30B 3/00; B30B 13/00
[52] U.S. Cl. ........................................ 100/35; 100/177; 100/188 R; 100/98 A; 100/100; 100/191
[58] Field of Search .............. 100/177, 178, 144, 188, 100/189, 210, 35, 103, 108, 100, 98 A, 98 R; 56/341

[56] References Cited

U.S. PATENT DOCUMENTS

| | | |
|---|---|---|
| 506,892 | 6/1893 | Wiebe . |
| 817,984 | 4/1906 | North ................................ 100/98 A |
| 1,118,946 | 2/1915 | Miller . |
| 4,037,528 | 7/1977 | White et al. ......................... 100/191 |
| 4,464,889 | 8/1984 | Weelink . |

FOREIGN PATENT DOCUMENTS 265970  7/1929  Italy ..................................... 100/191

Primary Examiner—Peter Feldman
Attorney, Agent, or Firm—James D. Welch

[57] ABSTRACT

A baling machine of comparatively non-complex construction is disclosed. The baling machine comprises a baling chamber, which is of adjustable size in which can be mounted a ventillating hole making tube; and an eccentrically mounted circular or oval element. The eccentrically mounted circular or oval element is located at the entrance of the baling chamber, and as it rotates causes entering hay or other forage to be entered into the baling chamber and formed into a bale.

4 Claims, 1 Drawing Sheet

BALING MACHINE AND METHOD OF FORMING A BALE

The invention in this application was disclosed in Disclosure Document No. 171,661.

TECHNICAL FIELD

The present invention relates to baling machines, and in particular to a mechanically non-complex baling machine which incorporates an eccentrically mounted cam to compact entering hay, straw or other forage.

BACKGROUND

Baling machines are well known in the art. A patent to Wiebe for instance, U.S. Pat. No. 506,892, teaches a machine which can be drawn about a field, from which it takes up hay and delivers said hay to a baling chamber, where it is pressed into a bale by piston-like action. A patent to Miller, U.S. Pat. No. 1,118,946 also teaches a baling machine which works on the basis of plunger or piston-like action. A patent to Weelink, U.S. Pat. No. 4,464,889 teaches a baling machine which utilizes a rotary element, from which extends radial partitions. The rotary element and radial partitions rotate adjacent to an arcuate wall section such that a space is created between the radial partitions and the arcuate wall section. Hay, or other forage material is fed into the identified space and then moved to a baling chamber, where it is caused to become compacted, by the action of the rotary element and radial partitions.

While the indicated inventions are viable machines, one skilled in the art of using them is struck by their complexity and abundance of parts. Such complexity makes the machines vulnerable to malfunction. A less complex baling machine, which still performs the baling function would be of value to industry and end users. There is always a need for less complex machinery which performs the function of more complex equipment.

DISCLOSURE OF THE INVENTION

The present invention provides a less complex approach to construction of machines which bale hay or other forage material than has been known in the prior art. The new invention also provides for production of bales of varying size and of bales with ventilation holes extending through their interior. The primary aspect of the new invention is an eccentrically mounted circular or oval element, or a series of such elements mounted side by side, hereinafter referred to as EMCOE, which is caused to rotate at a position between a source of hay or other forage, and a baling chamber. During a cycle of rotation of the EMCOE, hay or other forage is fed to a location on a feeding table structure which is positioned under the EMCOE when the EMCOE is rotated so that its longer aspect is oriented upward. When the EMCOE is rotated so that its longer aspect is brought down and nearly contacts the feeding table structure, it casues the hay or other forage thereon to be pushed to the side to which the EMCOE is moving. On that side is located a baling chamber. The EMCOE forces the identified hay or other forage into the baling chamber, where a bale is formed by successive cycles. The baling chamber is constructed so as to allow easy change in dimension, and so as to include a hole forming tube or tubes around which hay or other forage accumulates as a bale is formed. Said hole forming tube(s) provide for production of a ventilated bale which is less likely to rot as a result of trapped moisture.

Summary of the Invention

Investigation of the relevant art reveals that baling machines are old in that art. Study of the approach to construction of prior baling machines also shows that complex mechanical designs have been pursued. Those skilled in the art of using complex equipment are aware that with complexity comes the increased chance of breakdown. There is always a need for less complex equipment which can perform the same function as does more complex equipment.

The present invention provides a simple approach to the construction of a baling machine. The new design replaces all complex apparatus required to cause piston-like compacting action, or all apparatus necessary to form radial projections from a rotating element etc., as are required in previous designs for baling machines. Said complex equipment is replaced with a very simple eccentrically mounted circular or oval element, or series of such elements mounted side by side, (EMCOE). The EMCOE is mounted in apparatus between a source of hay or other forage, and a baling chamber. The baling chamber is constructed to be variable in size and to provide for a ventilating tube or tubes to be mounted therein.

A purpose of the invention is to provide a mechanically non-complex system for producing bales of hay, or other forage, of varying size and with a ventilating hole or holes therein.

DETAILED DESCRIPTION

Figure 1:
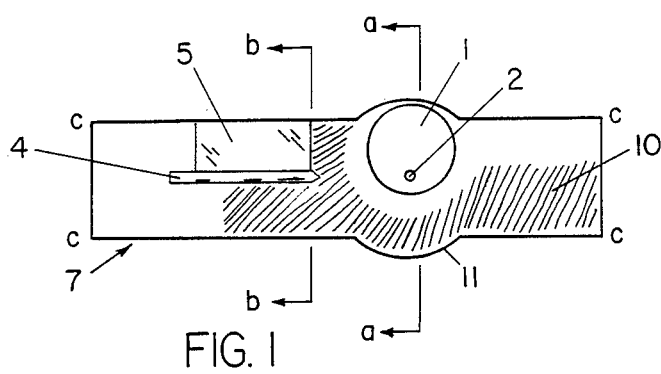
FIG. 1 is a side elevational cross section drawing taken at C—C of FIGS. 4a and 4b. Shown are the baling chamber, hole forming tube and eccentrically mounted circular or oval element. Also shown is hay or other forage as it enters and is forced into the baling chamber.
Figure 4A:
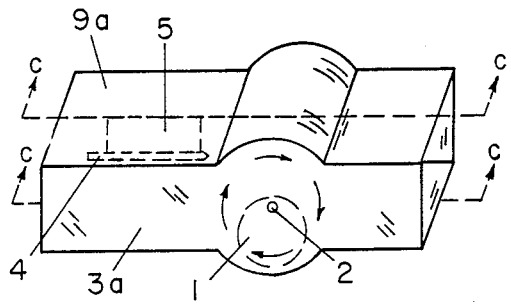
FIGS. 4a and 4b show a perspective of the invention in two stages of the rotation cycle of the eccentrically mounted circular or oval element.
Figure 4B:
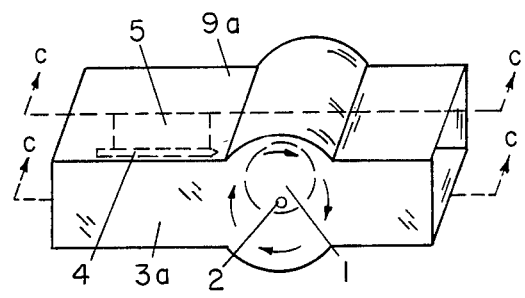

Referring now to FIG. 1, there is shown a side elevational crossectional view taken at C—C on FIGS. 4a and 4b. Of particular importance is the eccentrically mounted circular or oval element (EMCOE) (1) which is mounted on shaft (2). When the EMCOE is caused to rotate, as depicted in FIGS. 4a and 4b, hay or other forage (10) which is entered from the right side in FIG. 1, and is present on feeding table structure (11), is forced into the baling chamber (7) at the left in FIG. 1 by the rotating EMCOE. Mounted in the baling chamber (7) can be a hole forming tube (4) which attaches to the top (or bottom or side) of the baling chamber by way of plate (5), which plate (5) is sharpened into a knife-edge at the forward edge (6) thereof.

Figure 2:
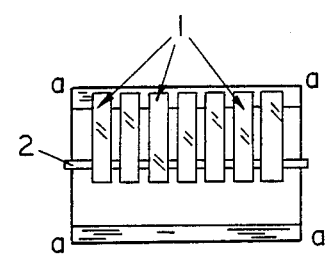
FIG. 2 is an elevational cross section drawing taken at A—A on FIG. 1 showing multiple element construction of eccentrically mounted circular or oval elements.

FIG. 2 shows a cross sectional elevational view taken at A—A in FIG. 1. Note the EMCOE is constructed of a series of elements attached side by side to a shaft (2).

Figure 3:
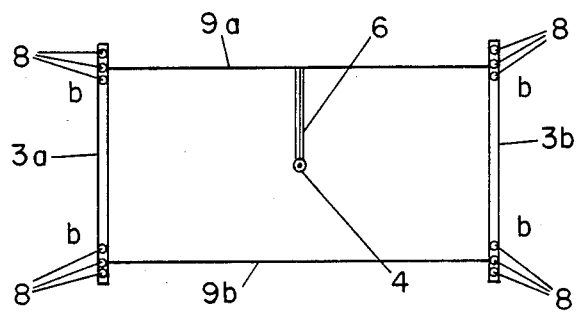
FIG. 3 is an elevational cross section drawing taken at B—B on FIG. 1. Shown are the size adjusting aspects of the baling chamber and hole forming tube/knife edge support combination.

FIG. 3 shows a cross sectional elevational view taken at B—B in FIG. 1. The knife edge (6) on plate (5) is shown. Note also, as indicated by (8) in FIG. 3, means for adjusting the size of the baling chamber is present, said means being shown as a series of holes in sides (3a) and (3b) of the baling chamber (7) into which the top (9a) and bottom (9b) of the baling chamber can be mounted at different locations.

Figure 5:
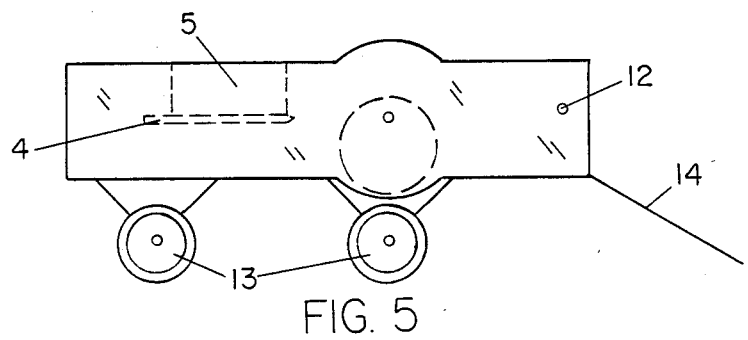
FIG. 5 shows the invention with apparatus attached to allow use in a field or other setting.

FIG. 5 shows the invention with wheels (13), hay or other forage guide (14) and propulsion attachment means (12) indicated. Such apparatus allows use of the invention in a field or other location.

Having hereby disclosed the subject matter of this invention, it should be obvious that many modifications, substitutions, and variations of the present invention are possible in light of the teachings. It is therefore to be understood that the invention may be practised other than as specifically described, and should be limited in breadth and scope by the claims.

I claim:

1. A baling machine comprising a baling chamber having an eccentrically mounted circular or oval shaped means mounted at an entrance to said baling chamber, said eccentrically mounted means comprising a plurality of aligned, circular or oval elements mounted side by side with spaces therebetween and without any projecting members attached to any of said elements, each of said spaced elements being eccentrically mounted to a single rotary driven shaft, said elements being mounted at said entrance to the baling chamber in a fashion such that each element is made to rotate about its eccentric axis causing hay or other forage material to enter the baling machine at the location of said elements, the resulting interraction leading to the forcing of the entering material into the baling chamber and the compacting of the material in the chamber into a bale only by the action of said eccentrically mounted elements acting on said material.

2. A baling machine as in claim 1 in which the baling chamber has means for adjusting the size of the baling chamber.

3. A baling machine as in claim 1 in which a hole making tube is attached to the inside of the baling chamber, such that when hay or other forage material is forced into the baling chamber and formed into a bale, said bale will have a ventilating hole therein.

4. A method of forming bales of hay or other forage material in a baling machine, said method comprising:
feeding said material to a baling machine having a baling chamber provided with a plurality of aligned, circular or oval shaped elements mounted side by side with spaces therebetween and without said elements having any projecting members attached thereto, said elements being eccentrically mounted on to a rotary shaft at the entrance to baling chamber; rotatingly driving said shaft and said eccentrically mounted elements so as to cause said material to enter the baling machine at the location of the rotating elements and then be forced into the baling chamber only by the action of the rotating eccentrically mounted elements, where the material is formed by this action into compacted bales, and, removing the compacted bales from the baling machine.

* * * * *